US008200577B2

(12) United States Patent
Leskuski

(10) Patent No.: US 8,200,577 B2
(45) Date of Patent: Jun. 12, 2012

(54) SYSTEMS AND METHODS FOR RETRIEVING AND MODIFYING DATA RECORDS FOR RATING AND BILLING PURPOSES

(75) Inventor: Walter J. Leskuski, Frederick, MD (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2520 days.

(21) Appl. No.: 10/097,869

(22) Filed: Mar. 15, 2002

(65) Prior Publication Data

US 2002/0138378 A1    Sep. 26, 2002

Related U.S. Application Data

(60) Provisional application No. 60/276,923, filed on Mar. 20, 2001, provisional application No. 60/276,953, filed on Mar. 20, 2001, provisional application No. 60/276,955, filed on Mar. 20, 2001, provisional application No. 60/276,954, filed on Mar. 20, 2001.

(51) Int. Cl.
*G06Q 40/00* (2012.01)
(52) U.S. Cl. .......................................... 705/40; 705/35
(58) Field of Classification Search ............... 705/35–45
See application file for complete search history.

(56) References Cited

U.S. PATENT DOCUMENTS

| | | | |
|---|---|---|---|
| 5,852,812 A | 12/1998 | Reeder | |
| 6,035,281 A | 3/2000 | Crosskey et al. | |
| 6,047,267 A * | 4/2000 | Owens et al. | 705/34 |
| 7,937,439 B2 * | 5/2011 | Lurie | 709/204 |
| 2001/0009002 A1 | 7/2001 | Logan et al. | |
| 2002/0026394 A1 * | 2/2002 | Savage et al. | 705/34 |
| 2002/0138296 A1 * | 9/2002 | Holmes, Jr. | 705/1 |
| 2004/0128139 A1 * | 7/2004 | Ilan et al. | 704/275 |
| 2008/0240376 A1 * | 10/2008 | Conway et al. | 379/88.03 |
| 2008/0260137 A1 * | 10/2008 | Poi et al. | 379/212.01 |
| 2009/0318111 A1 * | 12/2009 | Desai et al. | 455/406 |
| 2010/0158234 A1 * | 6/2010 | Vasquez et al. | 379/212.01 |
| 2011/0246308 A1 * | 10/2011 | Segall et al. | 705/14.66 |

OTHER PUBLICATIONS

"Sun Microsystems: Sun Microsystems, iPlanet, VeriSign and Portal Software launch iForce Solution Set for Internet bill presentment and payment". M2 Presswire. Coventry: Jun. 7, 2000. (5 pages).*
"Convergent Communications Chooses Portal Software to Support Internet and Web Communications Services". Business Editors/High-Tech Writers. Business Wire. New York: Sep. 27, 2000. (3 pages).*
"eStara Chooses Portal Software's Customer Management and Billing Platform". Business Editors/High-Tech Writers. Business Wire. New York: Feb. 1, 2001. (3 pages).*
http://web.archive.org/web/*/http://www.portal.com. (5 pages).*
"Portal Software to Support Dialpad Voice Over the Internet Services". Business/High-Tech Editors. Business Wire. New York: Oct. 25, 2000. (3 pages).*

(Continued)

*Primary Examiner* — William Rankins

(57) ABSTRACT

An operational support system includes a data collection unit and a number of network devices that are associated with various telecommunications services. The data collection unit retrieves raw data records from the network elements and identifies information in the raw data records that is relevant for billing purposes. The data collection unit normalizes the raw data records to create a billable record. The billable record may then be passed to a rating or billing unit that determines the charges associated with a customer's use of the telecommunications services.

11 Claims, 12 Drawing Sheets

OTHER PUBLICATIONS

M2 Presswire. "Intel to acquire DataKinetics Ltd; Acquisition adds SS7 expertise to Intel's converged network focus". Coventry: Aug. 10, 2000. (3 pages).*

"Call Center@nywhere: The Complete Contact Center Solution", www.telephonyatwork.com, pp. 1-4, print date Mar. 14, 2002.

"Infranet", www.portal.com/products/infranet/infranet.html, pp. 1-4, print date Mar. 14, 2002.

www.xacct.com, 8 pages regarding XACCT usage, print date Mar. 14, 2002.

* cited by examiner

SYSTEMS AND METHODS FOR RETRIEVING AND MODIFYING DATA RECORDS FOR RATING AND BILLING PURPOSES

RELATED APPLICATIONS

This application claims priority under 35 U.S.C. §119(e) based on the following U.S. Provisional Applications: Ser. Nos. 60/276,923, 60/276,953, 60/276,955, and 60/276,954 all filed on Mar. 20, 2001, the disclosures of which are incorporated herein by reference.

FIELD OF THE INVENTION

The present invention relates generally to support systems for telecommunications service providers and, more particularly, to retrieving and modifying data records for rating and billing purposes.

BACKGROUND OF THE INVENTION

Telecommunications service providers continually increase the number of services and products they offer to customers. In a typical scenario, each product/service offered to customers may include its own commercial off the shelf (COTS) data collection and billing unit.

One problem associated with using a standard COTS data collection and billing unit is that the format of the collected data and the subsequently generated billing information is typically incompatible with the telecommunications service provider's billing system. In this case, the service provider is often forced to replace its legacy billing system (i.e., an existing system) in order to use the billing data or make dramatic changes to the legacy billing system to accept the billing data.

SUMMARY OF THE INVENTION

There exists a need for systems and methods that improve problems associated with data collection and billing in a system that includes a number of different products/services.

These and other needs are met by the present invention where a data collection unit gathers information associated with a number of products/services offered by a telecommunications service provider. The data collection unit normalizes the collected data using customized enhancement/modification procedures and outputs billing data in an appropriate format for a billing or rating unit.

According to one aspect of the invention, a method for generating billable data records is provided in an operational support system that supports a number of telecommunications services. The method includes gathering data records from a number of network elements, where each element is associated with at least one telecommunications service. The method also includes identifying information in the data records that is relevant to rating or billing and generating billable records based on the identifying. The method further includes forwarding the billable record to a rating or billing system and rating the billable record.

Another aspect of the present invention provides a computer-readable medium having stored instructions which when executed by a processor, cause the processor to retrieve data from a number of network elements, where each element is associated with a telecommunications service. The instructions also cause the processor to identify information in the data that is relevant for billing, modify the data to create a billable record and forward the billable record to a billing unit.

A further aspect of the present invention provides an operational support system that includes a number of network elements, a data collection unit and a billing unit. The network elements are associated with a number of systems that provide telecommunications services. The data collection unit is configured to gather data records from the network elements and identify information in the data records relevant for billing. The data collection unit is also configured to generate billable records based on the identifying and forward the billable records to the billing unit. The billing unit is configured to receive the billable records and determine charges for the customer based on the billable records.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide a data collection unit that retrieves raw data records and makes custom modifications to the data records. The data records may then be rated for billing purposes.

Exemplary System

Figure 1:
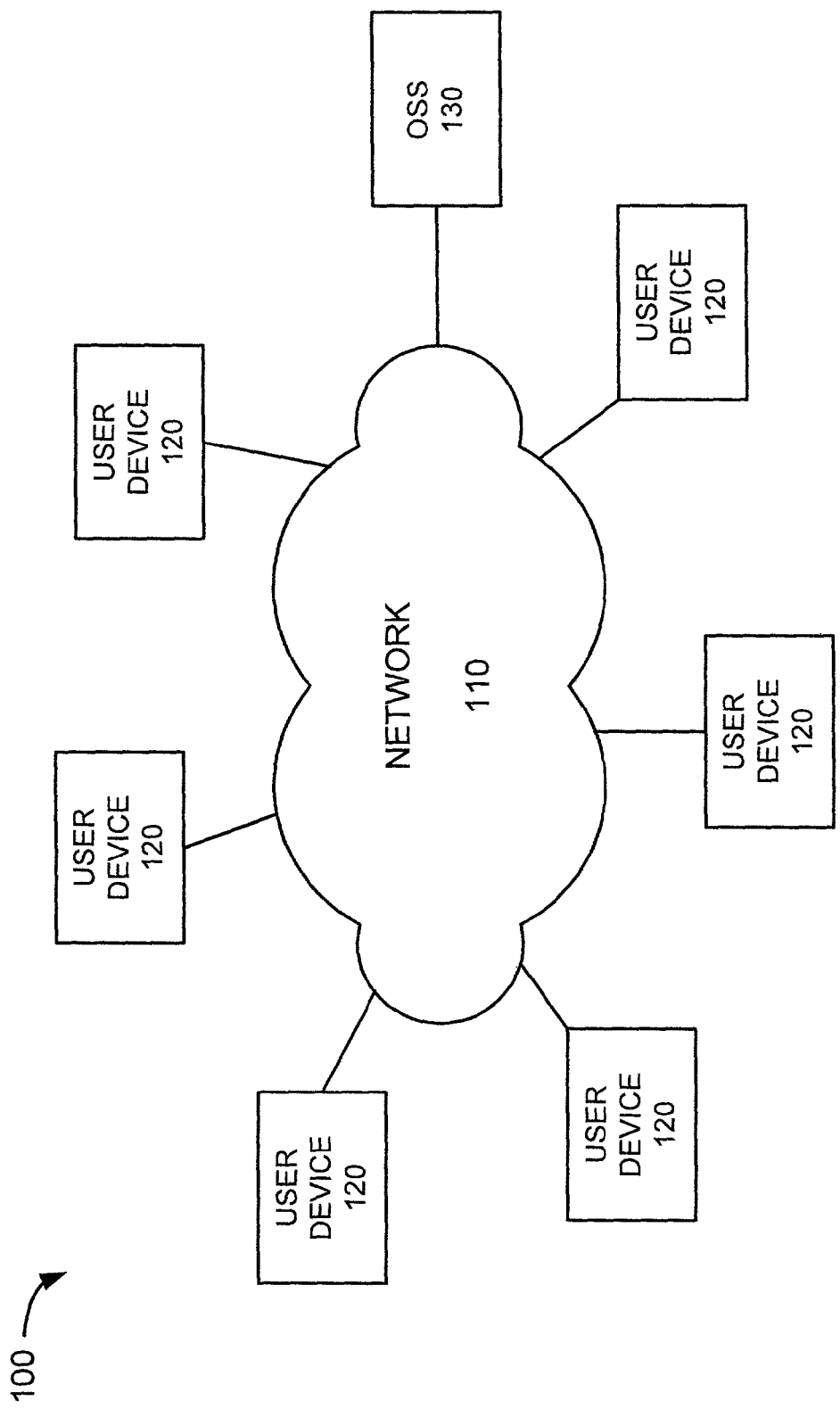
FIG. 1 is a block diagram of an exemplary system in which methods and systems consistent with the present invention may be implemented.

FIG. 1 illustrates an exemplary system 100 in which methods and systems consistent with the present invention may be implemented. In FIG. 1, system 100 includes a network 10 that interconnects a group of user devices 120 and an operational support system (OSS) 130. It will be appreciated that a typical system may include more or fewer devices than illustrated in FIG. 1. Moreover, system 100 may include additional devices (not shown) that aid in the transfer, processing, and/or reception of data.

The network 110 may include, for example, the Internet, an intranet, a local area network (LAN), a metropolitan area network (MAN), a wide area network (WAN), a public switched telephone network (PSTN), and/or some other similar type of network. In fact, the network 110 may include any type of network or combination of networks that permits routing of information from a particular source to a particular destination.

The user devices 120 may include a type of computer system, such as a mainframe, minicomputer, or personal computer, a type of telephone system, such as a POTS telephone or a session initiation protocol (SIP) telephone, and/or some other similar type of device that is capable of transmitting and receiving information to/from the network 110. The user device 120 may connect to the network via any conventional technique, such as a wired, wireless, or optical connection.

Figure 2:
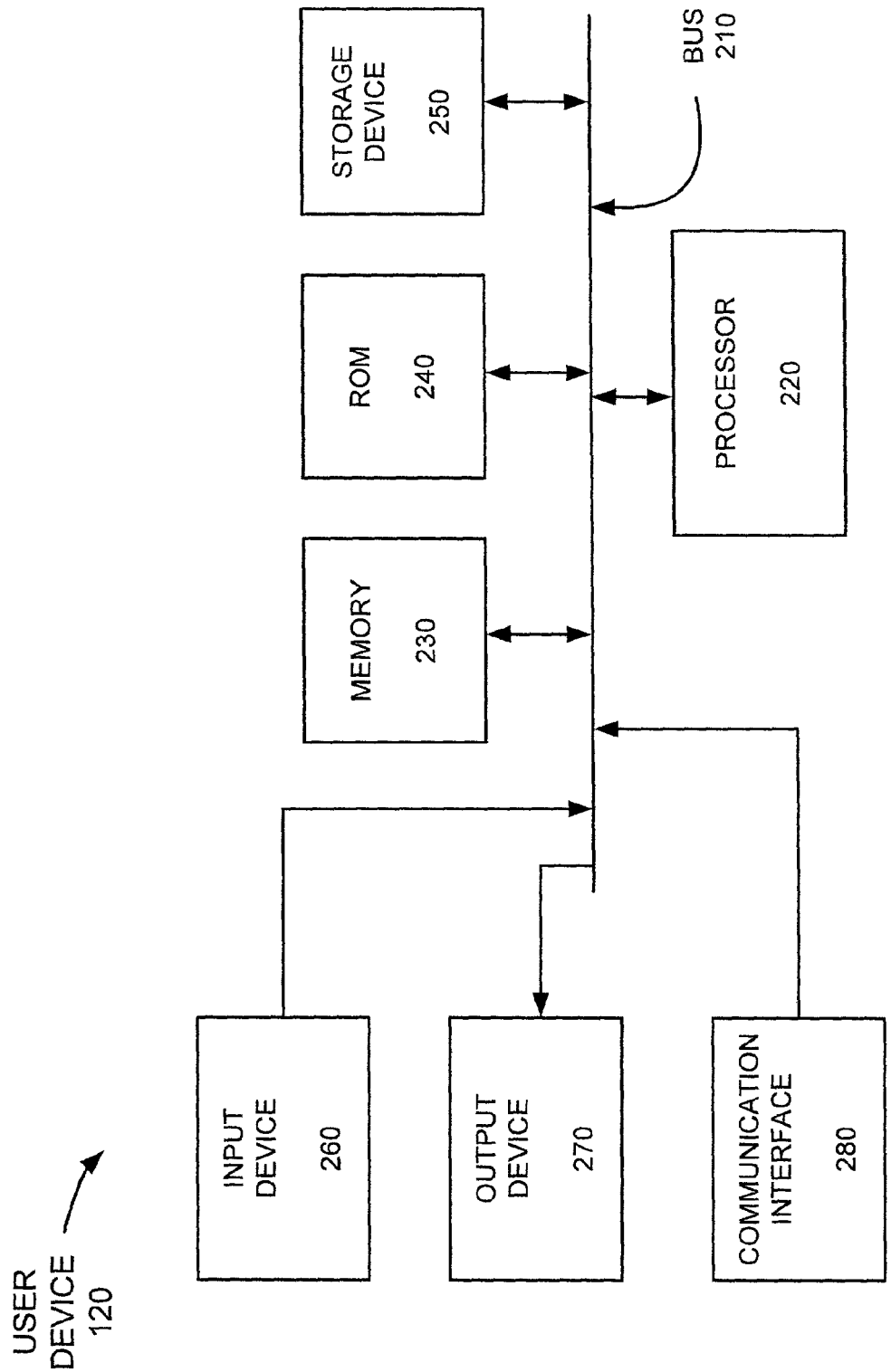
FIG. 2 illustrates an exemplary configuration of a user device of FIG. 1 in an implementation consistent with the present invention.

FIG. 2 illustrates an exemplary configuration of a user device 120 of FIG. 1 in an implementation consistent with the present invention. In FIG. 2, the user device 120 includes a bus 210, a processor 220, a memory 230, a read only memory (ROM) 240, a storage device 250, an input device 260, an output device 270, and a communication interface 280. The bus 210 may include one or more conventional buses that permit communication among the components of the user device 120.

The processor 220 may include any type of conventional processor or microprocessor that interprets and executes instructions. The memory 230 may include a random access memory (RAM) or another type of dynamic storage device that stores information and instructions for execution by the processor 220. The memory 230 may also be used to store temporary variables or other intermediate information during execution of instructions by processor 220.

The ROM 240 may include a conventional ROM device and/or another type of static storage device that stores static information and instructions for the processor 220. The storage device 250 may include a magnetic disk or optical disk and its corresponding drive and/or some other type of magnetic or optical recording medium and its corresponding drive for storing information and/or instructions.

The input device 260 may include any conventional mechanism that permits an operator to input information to the user device 120, such as a keyboard, a mouse, a microphone, a pen, a biometric input device, such as voice recognition device, etc. The output device 270 may include any conventional mechanism that outputs information to the operator, including a display, a printer, a speaker, etc.

The communication interface 280 may include any transceiver-like mechanism that enables the user device 120 to communicate with other devices and/or systems, such as OSS 130. For example, the communication interface 280 may include a modem or an Ethernet interface to a network. Alternatively, communication interface 280 may include other mechanisms for communicating via a data network.

Returning to FIG. 1, the OSS 130 provides the infrastructure for integrating applications supporting traditional telephony services and applications supporting non-traditional products/services. Through OSS 130, customers, using, for example, user device 120, may manage, configure, and provision services in real time, obtain real-time billing information, and generate reports using a rules-centric middleware core. In one embodiment, a customer may perform these functions through a single point of entry using an Internet accessible web interface.

Figure 3:
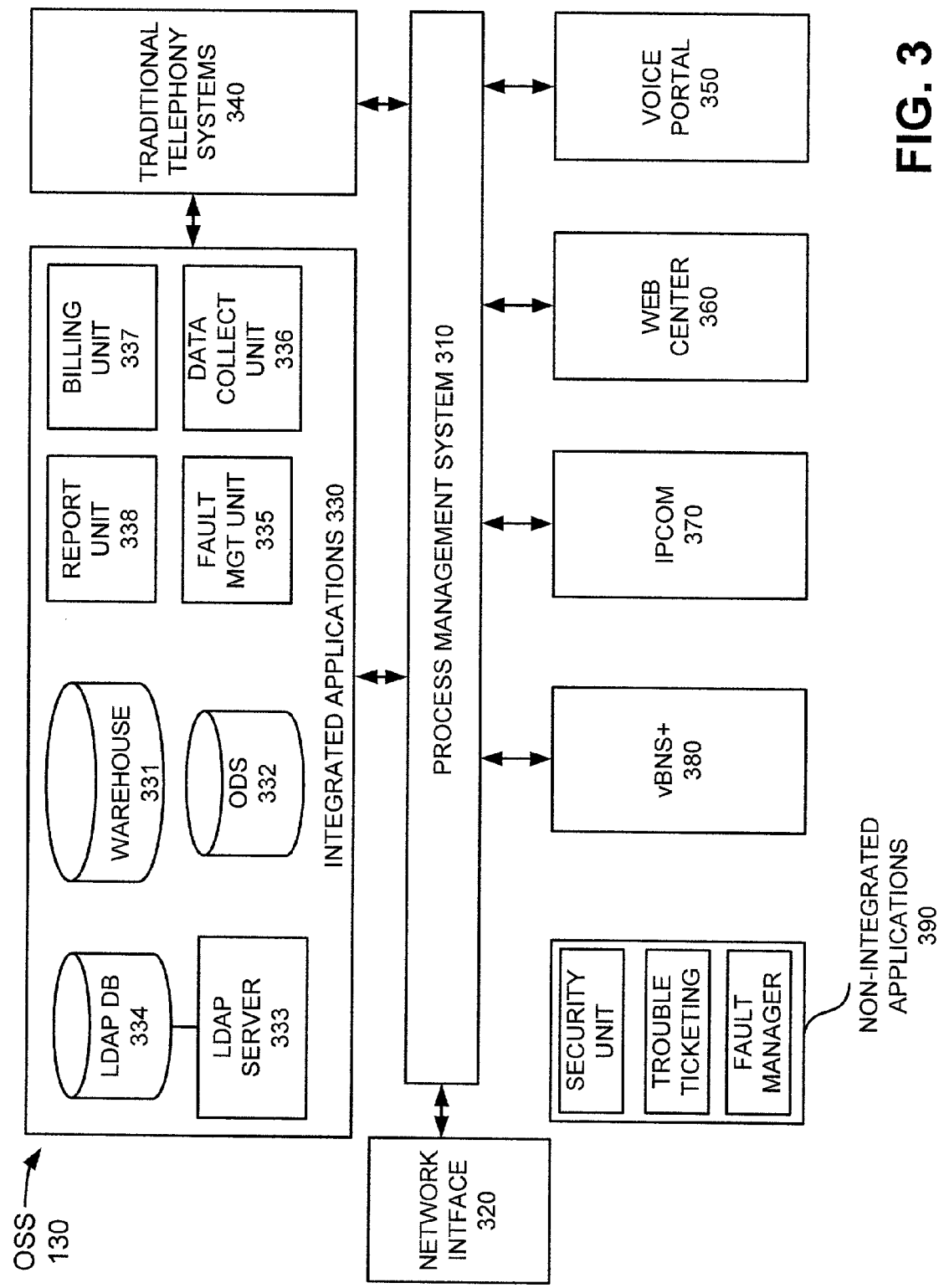
FIG. 3 illustrates an exemplary configuration of the operational support system (OSS) of FIG. 1 in an implementation consistent with the present invention.

FIG. 3 illustrates an exemplary configuration of the OSS 130 of FIG. 1 in an implementation consistent with the present invention. As illustrated, the OSS 130 includes a process management system 310, a network interface 320, a group of integrated applications 330, a group of traditional telephony systems 340, a voice portal unit 350, a web center unit 360, an Internet Protocol communications (IPCOM) unit 370, a very high performance backbone network service (vBNS+) unit 380, and a group of non-integrated applications 390. It will be appreciated that the OSS 130 may include other components (not shown) that aid in receiving, processing, and/or transmitting data.

The process management system 310 acts as the backbone to the OSS 130 by providing graphical process automation, data transformation, event management, and flexible connectors for interfacing with OSS 130 components. In one implementation consistent with the present invention, the process management system 310 uses a Common Object Request Broker Architecture (CORBA) based publish-and-subscribe messaging middleware to integrate the different components of the OSS 130. The process management system 310 may, for example, be implemented using Vitria Technology Inc.'s BusinessWare software system. Other techniques for integrating the different components of the OSS 130 may also be used, such as extensible markup language (XML) or Enterprise JavaBeans (EJB).

The network interface 320, also referred to as the web front end, provides a graphical user interface that allows users (e.g., customers, engineers, account teams, and the like) to access the components of the OSS 130. The network interface 320 may include commercial off the shelf (COTS) software or hardware packages, such as Siteminder by Netegrity Inc. and/or iPlanet by Sun Microsystems Inc., custom software or hardware or a combination of custom software/hardware and COTS software/hardware.

The network interface 320 may, for example, allow customers to request a new service or terminate an existing service and monitor or change network or user settings/preferences. The network interface 320 may also allow customers to obtain reports and billing information, perform account management and perform trouble reporting and tracking, all in a real time manner. The network interface 320 may also allow engineers to submit transactions to control and configure network elements and services in a real time manner. The network interface 320 may also allow account teams to create and cancel accounts, generate sub-accounts from master accounts, access current account data, and access historical account data.

The network interface 320 authenticates users and controls actions that authenticated users are allowed to execute in the OSS 130. In one implementation consistent with the present invention, the network interface 320 allows users access to the components of the OSS 130 via a single sign-on technique. This single sign-on eliminates the need for users to sign in (or authenticate themselves) in order to access different components of the OSS 130.

The integrated applications 330 may include, for example, a data warehouse 331, an operational data store (ODS) 332, a lightweight directory access protocol (LDAP) based server 333, an LDAP database 334, a fault management unit 335, a data collection unit 336, a billing unit 337 and a reporting unit 338. The data warehouse 331 may include one or more separate databases for storing data. The data warehouse 331 acts as a repository for service order, account, usage and performance data. In one implementation, the data warehouse 331 may be implemented as a relational database management system (RDBMS) and may include a server (not shown) that controls access to the data warehouse 331.

The ODS 332 may also include one or more separate databases for storing data. The ODS 332 temporarily stores data that is used in the course of fulfilling, for example, account creation, service order management, and network provisioning operations. The ODS 332 also stores authentication and authorization data. This data defines user's roles and privileges. Like the data warehouse 331, the ODS 332 may be a RDBMS and may include a server (not shown) that controls access to the ODS 332.

The LDAP server 333 may be a general directory server that controls access to the LDAP database 334. The LDAP database 334 may be an LDAP-based repository that stores information associated with users in a hierarchical, tree-like structure. For example, the LDAP database 334 may store attributes for a user that may include preferences associated with the following exemplary services: call blocking, follow-me, call forwarding, voice mail, conference calling, single line extension, call screening, quality of service, class of service, dial plan restrictions, dynamic registration, secondary directory number and call transfer. The LDAP database 334 may store this information as one or more directory entries for each user. Each directory entry may include an identifier associated with the user and a collection of attributes associated with the user. Each of the attributes may include a type and one or more values that identify the user's settings associated with that type. In this manner, the LDAP server 333 and LDAB database 334 provide a system that enables the user's preferences regarding various services to be stored, searched, updated and retrieved in an efficient manner. The LDAP server 333 and LDAP database 334 are shown as separate devices. It should be understood, however, that these two devices may both be part of the same directory server in implementations consistent with the present invention.

The fault management unit 335 monitors and manages the operation of the OSS 130. The fault management unit 335 may receive information from every device, computer and application in the OSS 130 via the process management system 310. In situations where a fault has been detected, the fault management unit 335 may transmit a trouble ticket identifying the fault to the appropriate system administrator.

The data collection unit 336 collects usage and performance data for the products supported by the OSS 130. In one implementation, the data collection unit 336 utilizes a hierarchical architecture, having a centralized manager that defines and manages collection and data transformation. Individual, lower level gatherers interface with source targets. The data collection unit 336 may aggregate the gathered data and provide the data to other end-user applications in a desired format. For example, data collection unit 336 may provide various records to billing unit 337, as described in more detail below. In one implementation, the data collection unit 336 may be implemented using XACCTusage by XACCT Technologies Inc.

The billing unit 337 receives customer usage and performance data from the data collection unit 336 and rates the received information to generate charges for the customers. The billing unit 337 may be configured with a variety of rating rules and plans and may provide mechanisms to manage and create rating plans. The rating rules may include traditional telephony styled rating rules that include time-of-day, day-of-week, distance-based, flat rate, non-recurring and recurring on a definably regular basis, such as weekly, bi-weekly, monthly, etc. In an exemplary implementation of the present invention, the billing unit 337 may provide bonus points, airline miles and other incentives as part of the rules-based rating and billing service.

The billing unit 337 may provide revenue and billing reports to authorized parties. The billing unit 337 may further allow customers to access previous invoices and view current charges not yet billed. In an exemplary implementation consistent with the present invention, the billing unit 337 may transfer rated events and summary records into other billing and revenue systems. For example, billing unit 337 may receive and transfer billing information or event information to a legacy billing system (i.e., an existing billing system) that generates the actual bill. In alternative implementations, billing unit 337 may provide hard copy bills and/or provide electronic bills to a customer. In this implementation, billing unit 337 may also be configured to perform electronic payment handling.

As customer orders and accounts are created or modified through normal business functions, the OSS 130 keeps the billing unit 337 up to date in a real-time manner. Authorized parties may also extract real-time data from the billing unit 337.

The reporting unit 338 may interact with various components of the OSS 130, such as the data warehouse 331, the data collection unit 336 and the billing unit 337, to provide user (i.e., customers, engineers and account team members) with the ability to obtain reports based on real-time data. The reports may include, for example, billing reports, reports regarding the usage and/or performance of the network, etc.

The traditional telephony systems 340 may include one or more components that are typically used in a telecommunications network. In one implementation, the traditional telephony systems 340 include one or more legacy systems, such as an order entry system, provisioning system, billing system, and the like.

The voice portal unit 350 provides a variety of information services to subscribers. These services may include, for example, banking, brokerage, and financial services, sports, weather, travel and entertainment services, distribution and shipping services, insurance services, health and pharmaceutical services, manufacturing services, and the like. The voice portal unit 350 may store subscriber profiles to determine a subscriber's device preference (e.g., a cellular telephone, a personal digital assistant (PDA), a paging device, a computer, a session initiation protocol (SIP) device, and the like). The voice portal unit 350 may also track a subscriber's access to the services provided for billing purposes.

The web center 360 acts as a virtual call center or contact center by queuing, routing and distributing communications from any first location to an appropriate agent at any second location. The web center 360 allows agents to handle multiple mediums (e.g., inbound telephone calls, faxes, e-mails, voice-mail, voice over Internet protocol (VoIP) transactions, etc.) via a single browser-based interface. In one implementation, the web center 360 may be implemented using CallCenter@nywhere from Telephony@Work, Inc.

The IPCOM unit 370 may include one or more devices that provide VoIP services to subscribers. The subscribers may make and receive calls via an IP communications network using, for example, session initiation protocol (SIP) telephones. The IPCOM unit 370 may support the following services: follow me, call blocking, call forwarding, voice mail, conference calling, single line extension, call screening, quality of service, class of service, dial-plan restrictions, dynamic registration, secondary directory number, and call transfer. Customers may set or change attributes associated with these features via the network interface 320.

The vBNS+ unit 380 provides the IP infrastructure for the IP communications network. The vBNS+ unit 380 may include a group of edge routers for routing packets in the network. The non-integrated applications 390 may include, for example, a security unit, a trouble ticketing unit, and a fault manager. The security unit may include one or more firewalls for securing the network interface 320, telephone equipment (e.g., PBX, switch, redirect server, etc.) and network equipment. The trouble ticketing unit manages the issuance and resolution of trouble tickets and the fault manager monitors the hardware components of the OSS 130.

Figure 4:
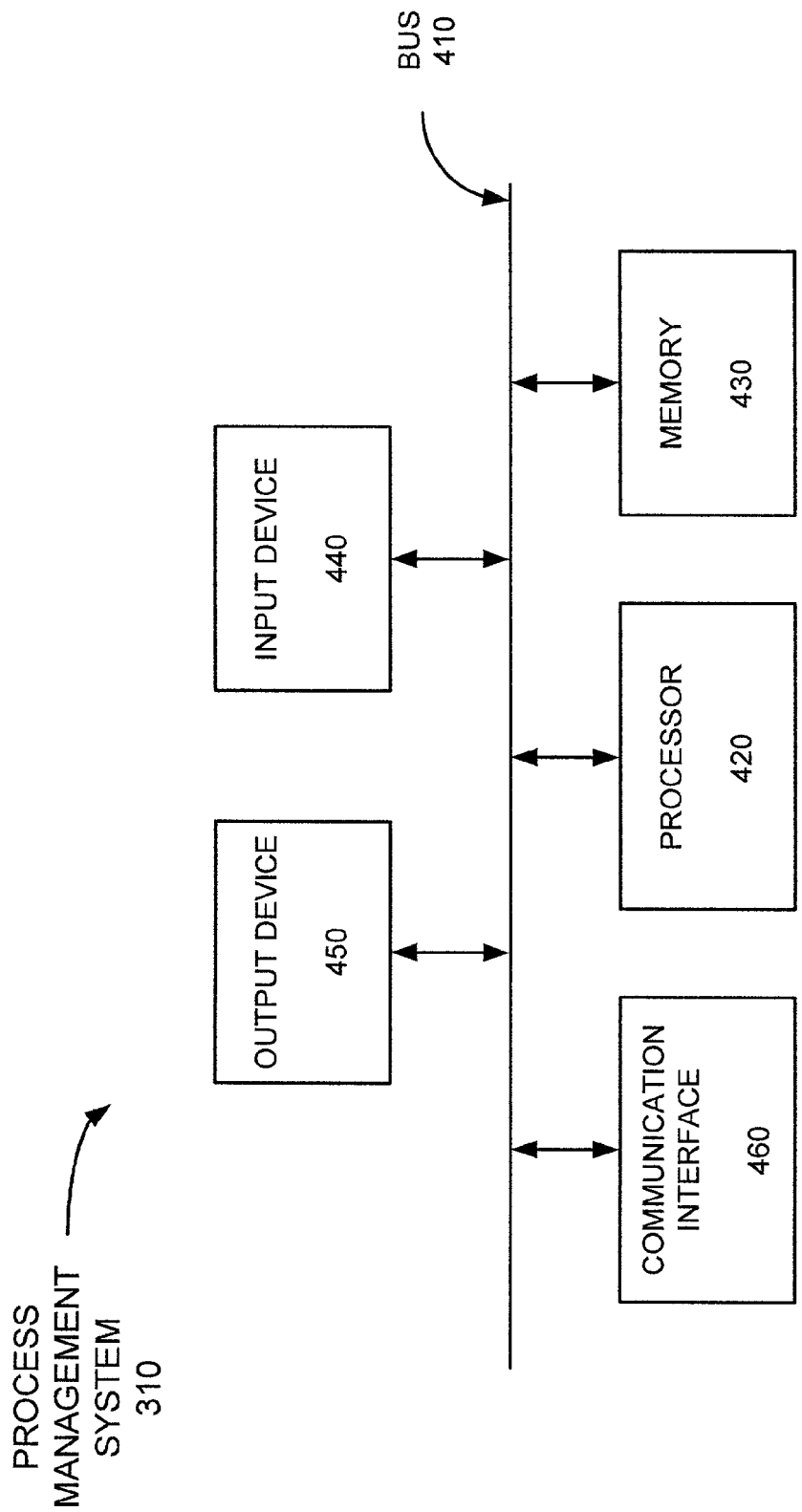
FIG. 4 illustrates an exemplary configuration of the process management system of FIG. 3 in an implementation consistent with the present invention.

FIG. 4 illustrates an exemplary configuration of the process management system 310 of FIG. 3 in an implementation consistent with the present invention. As illustrated, the process management system 310 includes a bus 410, a processor 420, a memory 430, an input device 440, an output device 450, and a communication interface 460. The bus 410 permits communication among the components of the process management system 310.

The processor 420 may include any type of conventional processor or microprocessor that interprets and executes instructions. The memory 430 may include a RAM or another type of dynamic storage device that stores information and instructions for execution by the processor 420; a ROM or another type of static storage device that stores static information and instructions for use by the processor 420; and/or some type of magnetic or optical recording medium and its corresponding drive.

The input device 440 may include any conventional mechanism that permits an operator to input information to the process management system 310, such as a keyboard, a mouse, a pen, voice recognition and/or biometric mechanisms, and the like. The output device 450 may include any conventional mechanism that outputs information to the operator, including a display, a printer, a speaker, etc. The communication interface 460 may include any transceiver-like mechanism that enables the process management system 310 to communicate with other devices and/or systems, such as the network interface 320, integrated applications 330, traditional telephony systems 340, etc. via a wired, wireless, or optical connection.

As discussed previously, process management system 310 may run a CORBA-based program to integrate various components of the OSS 130. As such, execution of the sequences of instructions associated with the program contained in a computer-readable medium, such as memory 430, causes processor 420 to implement the functional operations described below. In alternative embodiments, hardwired circuitry may be used in place of or in combination with software instructions to implement the present invention. Thus, the present invention is not limited to any specific combination of hardware circuitry and software.

Figure 5:
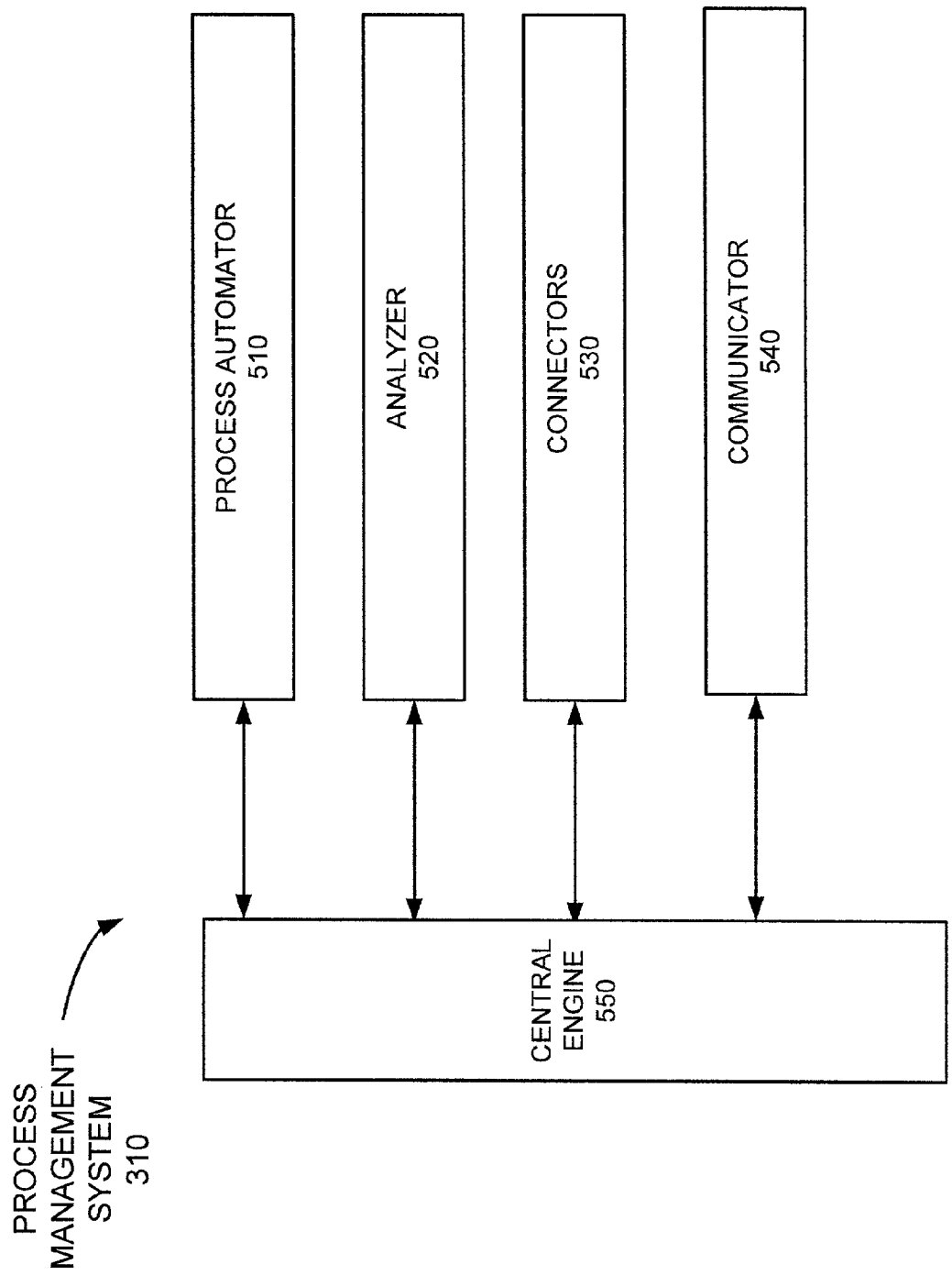
FIG. 5 illustrates an exemplary functional block diagram of the process management system of FIG. 3 in an implementation consistent with the present invention.

FIG. 5 illustrates an exemplary functional block diagram of the process management system 310 of FIG. 3 in an implementation consistent with the present invention. As illustrated, the process management system 310 includes a process automator 510, an analyzer 520, a group of connectors 530, a communicator 540 and a central engine 550. In an exemplary implementation of the present invention, these elements are implemented as functional modules of a software program executed by processor 420 of the process management system 310. It will be appreciated that the process management system 310 may execute additional functional modules (not shown) that aid in the reception, processing, and/or transmission of data.

The processor automator 510 includes a modeling tool that allows event processing to be visually modeled by engineers and product development analysts. The process automator 510 can then execute these models to create an automated business process executed by the central engine 550. The analyzer 520 provides on-going and real-time monitoring of the components of the OSS 130. The analyzer 520 delivers reports, history, and trending on events processed through the central engine 550. The connectors 530 allow the components of the OSS 130 to interact and communicate with the process management system 310. The OSS components may communicate with the process management system 310 via standard messaging or through full publish/subscribe processing. The communicator 540 enables the process management system 310 to communicate with various components of the OSS 130 using transmission control protocol/Internet protocol (TCP/IP). The central engine 550 is the core of the software program and executes customized rules to enable the process management system 310 to integrate the various systems of the OSS 130. It should be understood that the central engine 550 may be programmed to perform any rules-based processing based on the particular requirements associated with managing the OSS 130.

Figure 6:
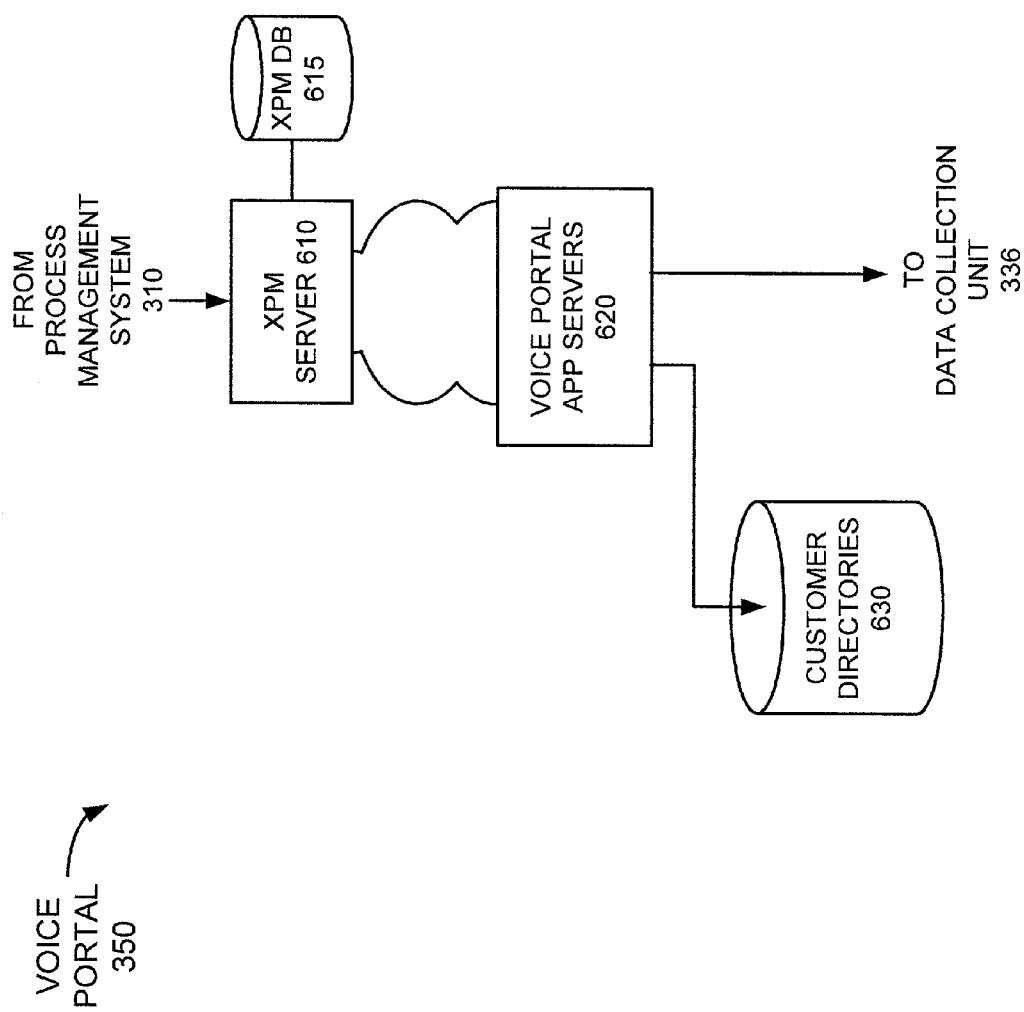
FIG. 6 illustrates an exemplary configuration of the voice portal of FIG. 3 in an implementation consistent with the present invention.

FIG. 6 illustrates an exemplary configuration of the voice portal unit 350 of FIG. 3 in an implementation consistent with the present invention. As illustrated, the voice portal unit 350 includes an extensible profile management (XPM) server 610, an XPM database 615, one or more voice portal application servers 620, and a customer directory database 630. The XPM server 610 receives user profile information from the network interface 320 via the process management system 310 and stores this information in the XPM database 615 for use by the voice portal application servers 620. The XPM server 610 may also receive other information, such as information identifying the device(s) (e.g., personal digital assistant, cellular telephone, pager, computer, SIP device, etc.) by which a user wishes to receive the information associated with a particular service(s) to which the user has subscribed. The XPM server 610 and the XPM database 615 are shown as separate devices. It should be understood that these devices may both be part of the same server in implementations consistent with the present invention.

The voice portal application servers 620 may include one or more servers that interact with the XPM server 610 to provide, for example, banking, brokerage, and financial services, sports, travel, weather and entertainment services, distribution and shipping services, insurance services, health and pharmaceutical services, manufacturing services, and the like. Voice portal application servers 620 may also provide data collection unit 336 with information regarding what services are accessed and by whom. The data collection unit 336 may then pass this information to billing unit 337 for billing purposes. The voice portal application servers 620 may be located at the OSS 130 or distributed throughout the network 110. The customer directories 630 may store information relating to the services provided by the voice portal application servers 620. For example, the customer directories 630 may store stock quotes, current weather forecasts, real-time sports scores, etc. In an exemplary implementation of the present invention, the voice portal application servers 620 communicate with the XPM server 610 and customer directories 630 using extensible markup language (XML).

Figure 7:
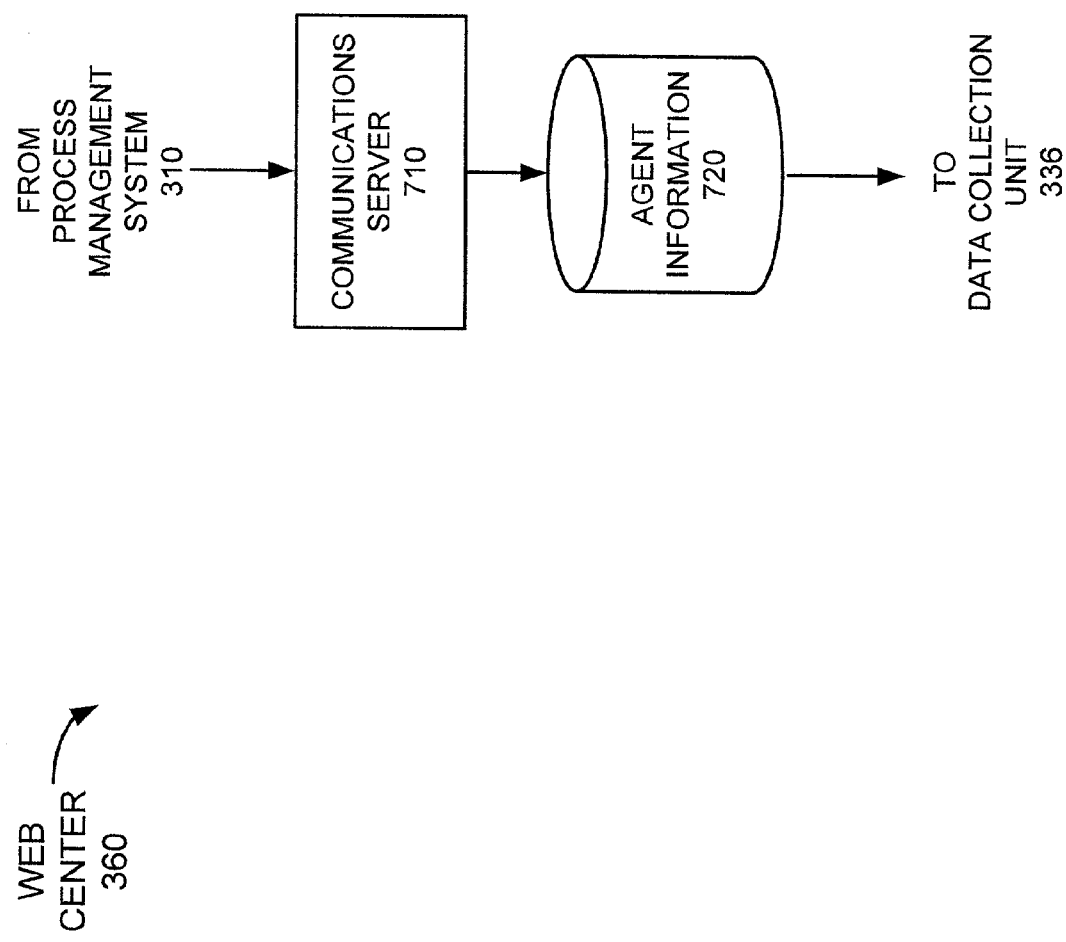
FIG. 7 illustrates an exemplary configuration of the web center of FIG. 3 in an implementation consistent with the present invention.

FIG. 7 illustrates an exemplary configuration of the web center 360 of FIG. 3 in an implementation consistent with the present invention. As illustrated, the web center 360 includes a communications server 710 and an agent information database 720. The communication server 710 queues, routes, and distributes communications from any first location to an appropriate agent at any second location. The communications server 710 may determine the appropriate agent based on data stored in the agent information database 720. The agent information database 720 may store agent activity information, the particular skills of the agents, and the like. Once a customer has utilized the services of the web center 360, the usage information may be transmitted to the data collection unit 336 and then to the billing unit 337 for billing. Users may, via the network interface 320, provision new services, such as order a toll free number.

Figure 8:
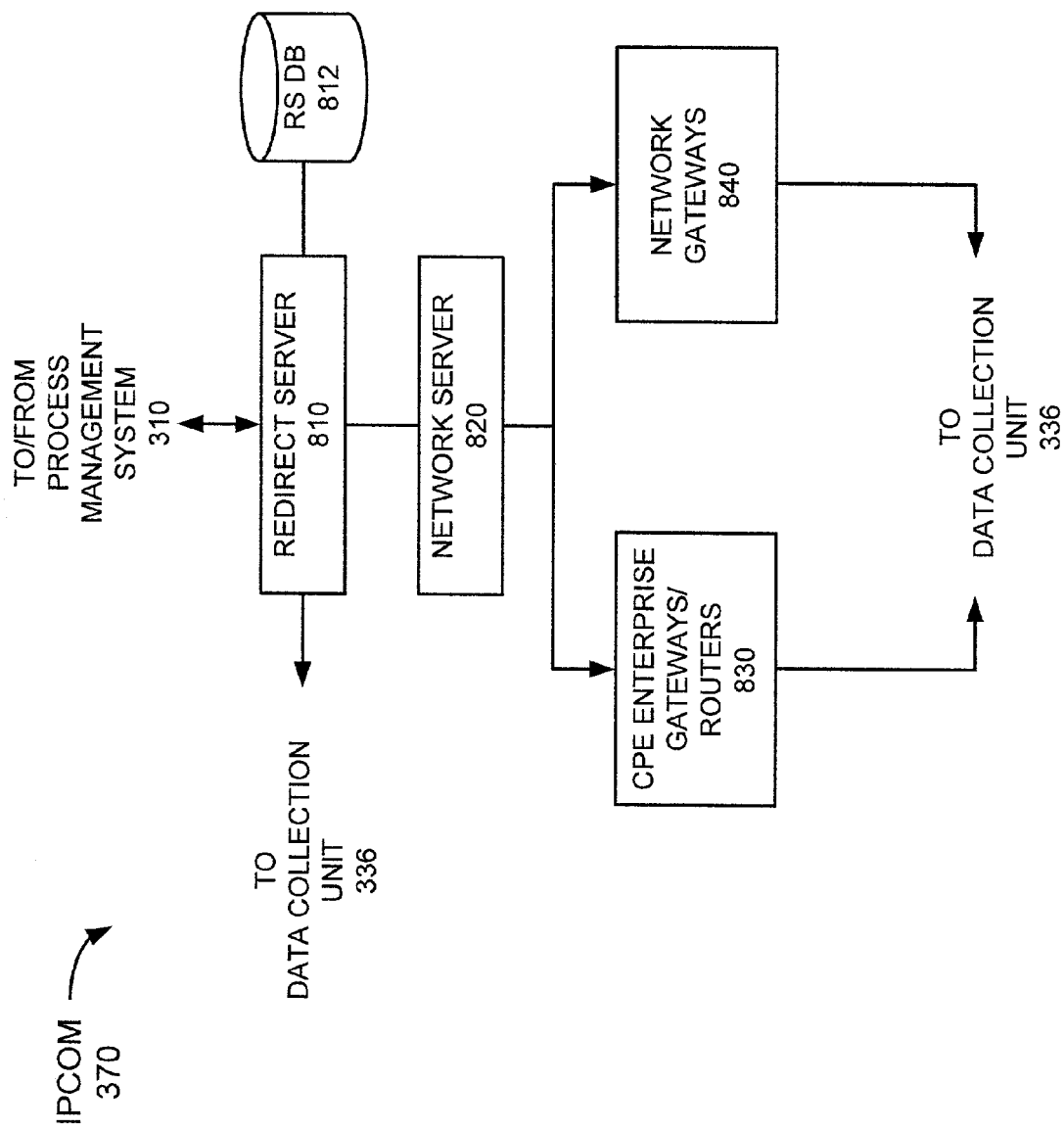
FIG. 8 illustrates an exemplary configuration of the Internet Protocol communications (IPCOM) unit of FIG. 3 in an implementation consistent with the present invention.

FIG. 8 illustrates an exemplary configuration of the IPCOM unit 370 of FIG. 3 in an implementation consistent with the present invention. As illustrated, the IPCOM unit 370 includes a redirect server 810, a redirect server database 812, network server 820, customer provided equipment (CPE) enterprise gateways/routers 830 and network gateways 840. According to an exemplary implementation, the redirect server 810 executes an object request broker (ORB) that is CORBA compliant. The redirect server 810 stores data in database 812 relating to call processing (e.g., information identifying the device by which the subscriber wishes to receive the call, network configuration information, etc.), subscriber profiles (e.g., a subscriber identifier) and network-supported features. The redirect server 810 may decide how to route calls based on information stored in redirect server database 812. The redirect server 810 and the redirect server database 812 are shown as separate devices. It should be understood that these devices may both be part of the same server in implementations consistent with the present invention.

The redirect server 810 forwards the routing information to the network server 820. The network server 820, also referred to as the proxy server or SIP server, processes the actual calls made over the IP communications network. The network server 820 directs the calls to CPE enterprise gateways/routers 830 or network gateways 840 based on the type of call and the network-supported features to which a customer subscribes. The network-supported features may include, for example, follow me, call blocking, call forwarding, voice mail, conference calling, single line extension, call screening, quality of service, class of service, dial-plan restrictions, dynamic registration, secondary directory number, and call transfer. As described above, a subscriber may change attributes of these network-supported features using the network interface 320. The redirect server 810 may also communicate with the data collection unit 336.

The CPE enterprise gateways/routers 830 may include one or more gateways for linking POTS telephone systems to the IP communications network. The CPE enterprise gateways/routers 830 may, for example, connect to a customer's private branch exchange (PBX) and convert TDM voice data into VoIP packets and voice signaling into SIP messages. The CPE enterprise gateways/routers 830 may also include one or more routers that receive information from a SIP phone over a network, such as a LAN or WAN.

The network gateways 840 may include one or more gateways for linking the IP communications network to the PSTN in a well known manner. The CPE enterprise gateways/routers 830 and network gateways 840 track customer access and transmit this customer access data to the data collection unit 336 for billing purposes.

Figure 9:
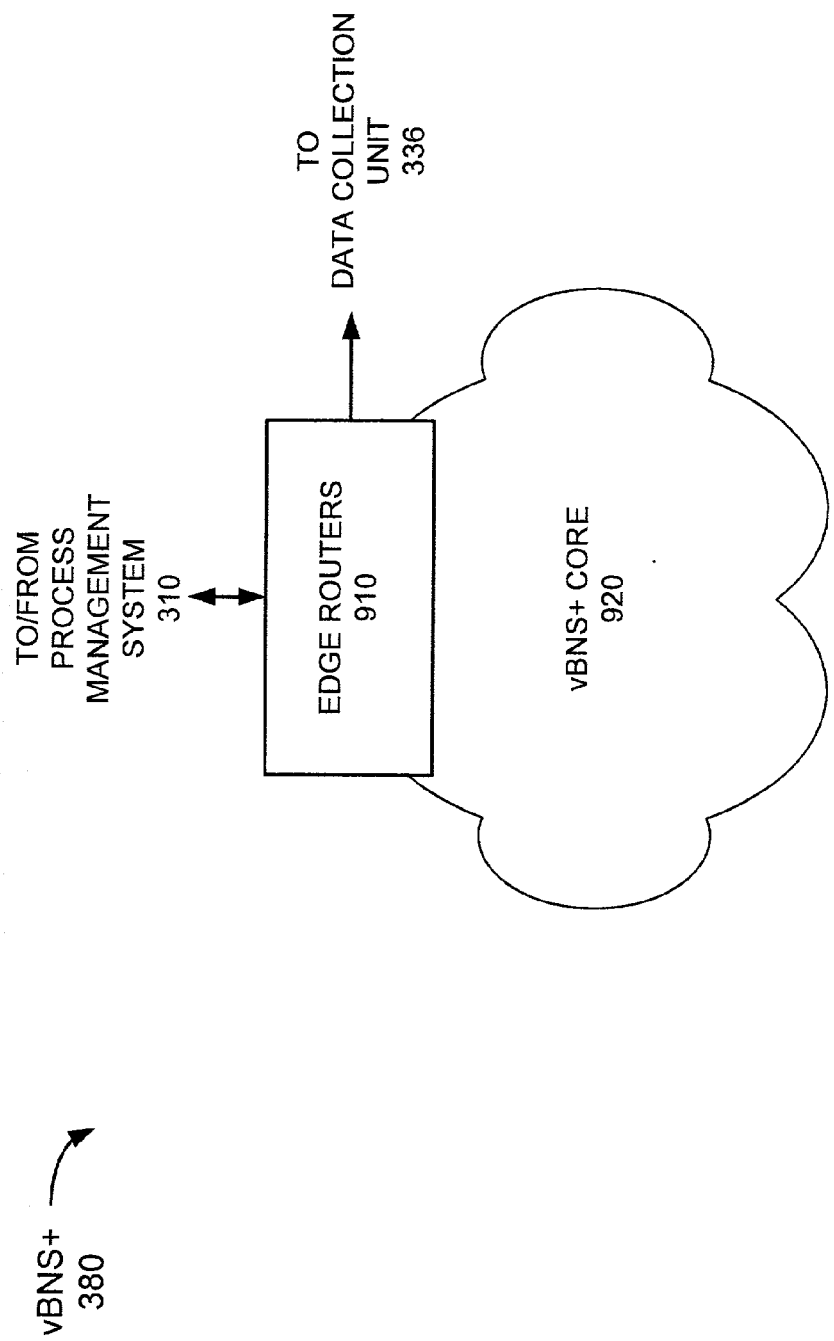
FIG. 9 illustrates an exemplary configuration of the very high performance backbone network service (vBNS+) unit of FIG. 3 in an implementation consistent with the present invention.

FIG. 9 illustrates an exemplary configuration of the vBNS+ unit 380 of FIG. 3 in an implementation consistent with the present invention. As illustrated, the vBNS+ unit 380 includes a group of edge routers 910 that route packets to/from the vBNS+ core network 920. The edge routers 910 may connect to the network server 820, redirect server 810, network gateways 830, customer's CPE equipment, other routers in the IP communications network, directly to SIP telephones, etc. The vBNS+ core 920 may include one or more core routers for routing packets between edge routers.

The foregoing description of the OSS 130 provides an overview of the components and operations of the OSS 130. A more detailed description of the present invention as embodied, for example, in the OSS 130, is provided below.

Generating Billable Record Information

As described previously, the OSS 130 may provide a number of services/products to users, such as services associated with voice portal unit 350, web center unit 360, IPCOM unit 370 and vBNS+ unit 380. The present invention is directed to systems and methods for collecting data associated with these services/units and forwarding usable billable information to billing unit 337.

Figure 10:
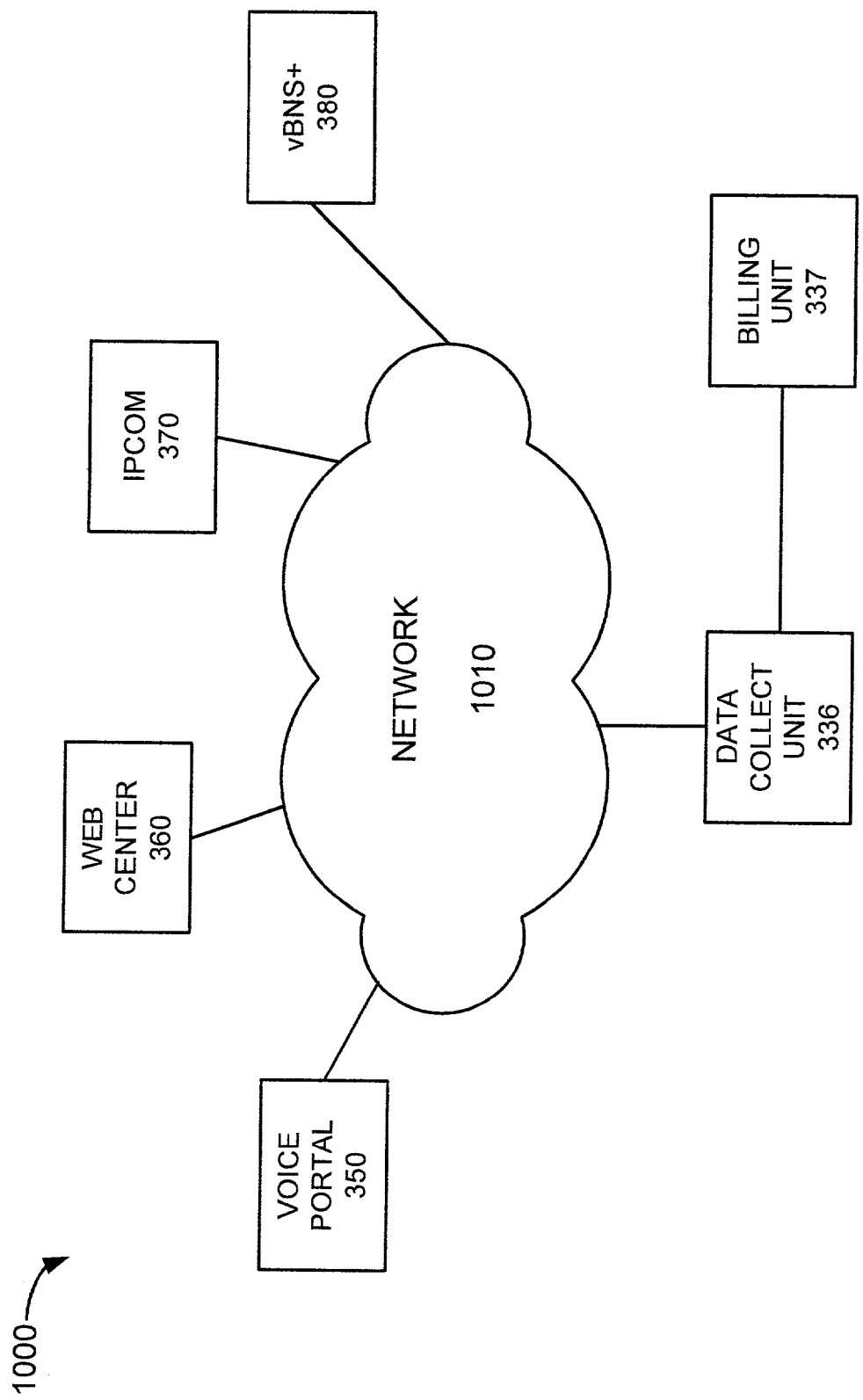
FIG. 10 is an exemplary block diagram of a portion of the OSS of FIG. 3 in an implementation consistent with the present invention.

FIG. 10 is an exemplary block diagram illustrating a portion of the OSS 130 of FIG. 3. Referring to FIG. 10, system 1000 includes data collection unit 336, billing unit 337, voice portal unit 350, web center unit 360, IPCOM unit 370, vBNS+ unit 380 and network 1010. Network 1010 may include a LAN, a WAN, a MAN, an intranet, the Internet and/or some other similar type of network that enables each of the units/systems in FIG. 10 to communicate with the data collection unit 336. In alternative implementations, the units in FIG. 10 may be directly connected to data collection unit 336.

Figure 11:
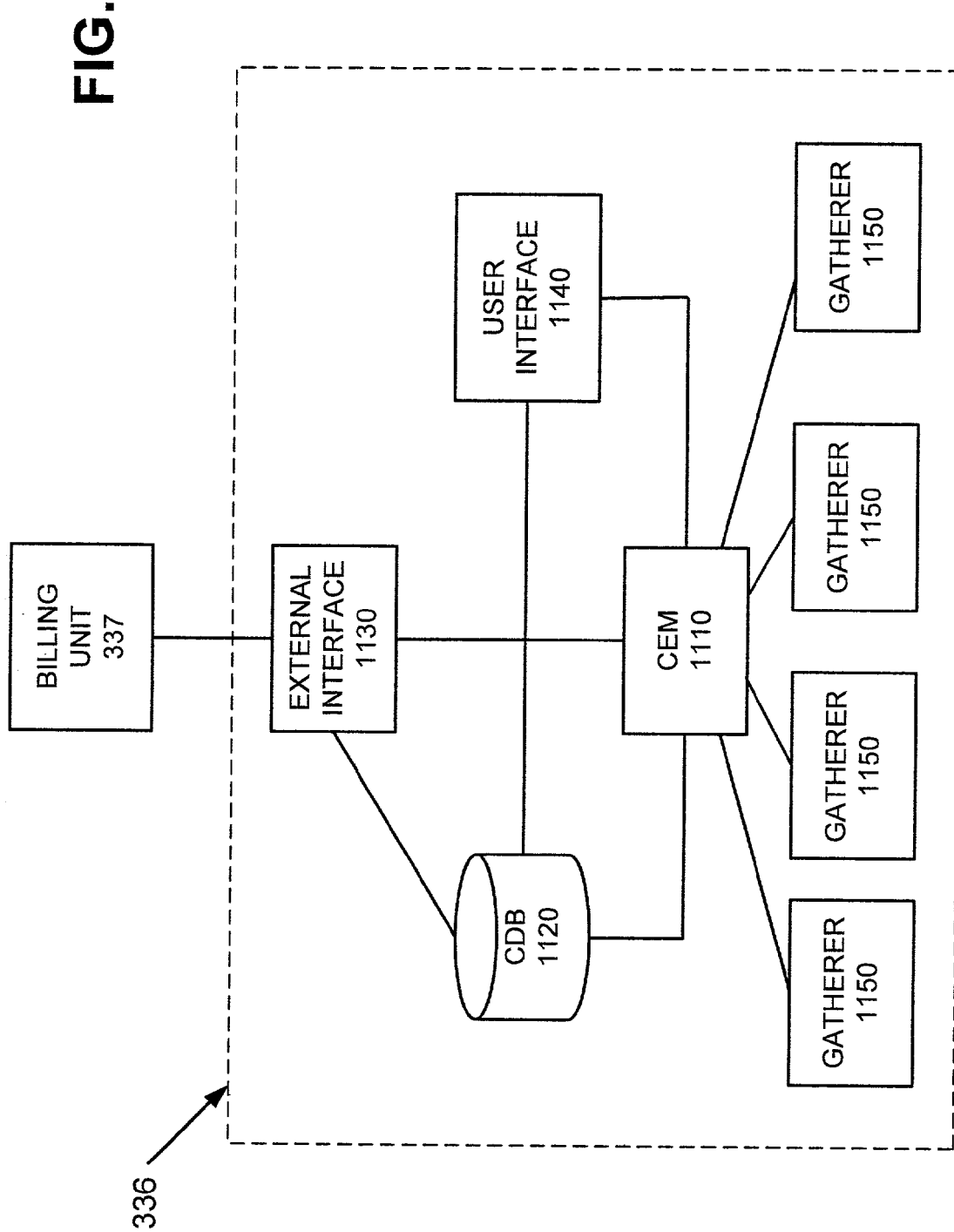
FIG. 11 illustrates an exemplary configuration of the data collection unit of FIG. 10 in an implementation consistent with the present invention.

FIG. 11 illustrates an exemplary configuration of the data collection unit 336 consistent with an implementation of the present invention. The data collection unit 336 includes a central event manager (CEM) 1110, a central database (CDB) 1120, an external interface 1130, a user interface 1140 and a number of gatherers 1150. Four gatherers 1150 are illustrated in FIG. 11. It should be understood that other numbers of gatherers 1150 may be used in implementations of the present invention.

The CEM 1110 coordinates, manages and controls the operation of the data collection unit 336. The CEM 1110 receives records collected by the gatherers 1150 and forwards them to their intended destinations. For example, the CEM 1110 may forward the records to a table in CDB 1120 or to external interface 1130.

The CDB 1120 stores and maintains data collected by the gatherers 1150. The CDB 1120 may also store other information used by CEM 1110 to generate revenue generating records that may be passed to billing unit 337. For example, CDB 1120 may store customer identification information that may be recognized by billing unit 337. The external interface 1130 may access the CDB 1120 to determine the customer's identification and append this identification into an outgoing record, as described in more detail below.

The external interface 1130 functions to convert the raw data records into normalized, revenue generating records. The external interface 1130 passes these normalized data records to the billing unit 337. The external interface 1130 may also function as an ingress gateway to receive data from other systems, such as the billing unit 337.

The user interface 1140 allows multiple clients to access the data collection unit 336, via for example, a conventional computer with a web browser. The remote users may be customers, account managers or engineering personnel that wish to review various data from the data collection unit 336.

The gatherers 1150 are multi-threaded agents that collect data from a number of network elements. For example, the gatherers 1150 may collect data from voice portal unit 350, web center unit 360, IPCOM unit 370 and vNBS+ unit 380. Each gatherer 1150 may include one or more information source modules (ISMs) that interface with the network elements. These ISMs may communicate via a number of protocols, such as Ethernet, UDP/IP, TCP/IP, SNMP, telnet, file access, ODBC, native API, etc.

The data collection unit 336 acts as a conversion point to normalize raw data records received from various components of the OSS 130 into revenue generating data records. The data collection unit 336, as described in more detail below, modifies the raw data records based on the business requirements associated with the particular product/service and passes billing records to billing unit 337. Billing unit 337 may then rate the billing records to determine the appropriate charges.

Figure 12:
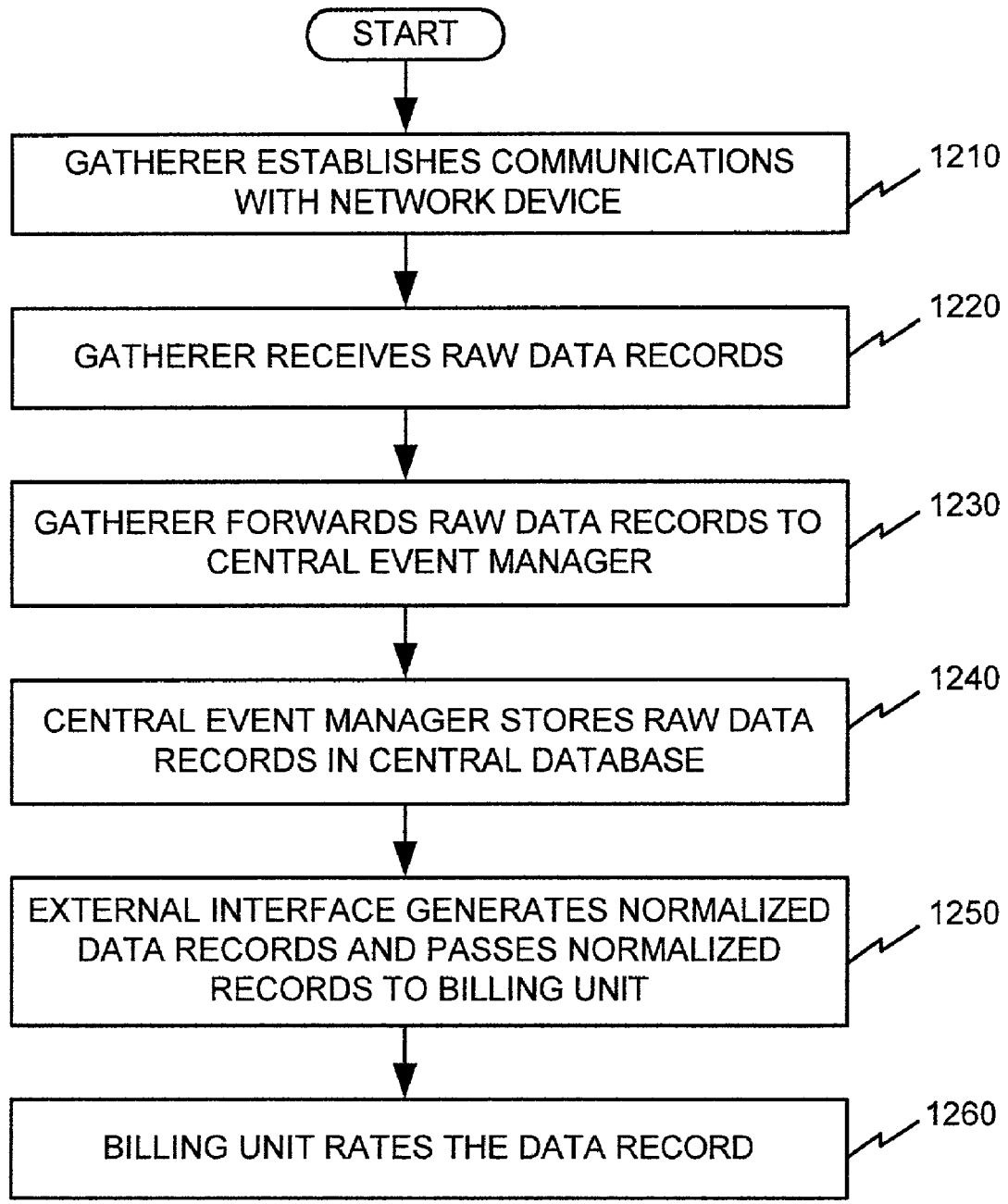
FIG. 12 is a flow diagram illustrating exemplary processing by the data collection unit in an implementation consistent with the present invention.

FIG. 12 is a flow diagram, consistent with the present invention, illustrating exemplary processing associated with the data collection unit 336. Processing may begin with a gatherer 1150 establishing communications with one of the units of system 1000 (act 1210). For example, one gatherer 1150 may be associated with each of voice portal unit 350, web center 360, IPCOM unit 370 and vBNS+ unit 380. Each of the respective gatherers 1150 may initiate communications with its corresponding unit to retrieve data from the respective unit in real time or near real time. Alternatively, the gatherers 1150 may periodically access their respective unit to gather raw data records.

For example, assume that one of the gatherers 1150 is associated with IPCOM unit 370. In this case, the gatherer 1150 may establish communications, using a number of ISMs, with the redirect server 810, network server 820, CPE enterprise gateways/routers 830 and network gateways 840. These network elements may include agents that collect information and the gatherers 1150 may establish communications with these peer agents. For example, a network gateway 840 may include an agent that collects record information corresponding to actions performed by the network gateway 840. This record information may include, for example, IP source address information and IP destination address information associated with a VoIP communication, a customer name, a start time of the VoIP communication, an end time of the VoIP communication, etc. The gatherer 1150 may receive this information from its peer agent in network gateway 840 (act 1220).

Gatherer 1150 forwards the raw data records to CEM 1110 (act 1230). The CEM 1110 may then store the raw data records in CDB 1120 (act 1240). The external interface 1130 may then modify or normalize the data into an appropriate format for billing unit 337 (act 1250). In an exemplary implementation consistent with the present invention, external interface 1130 may access the CDB 1120 at predetermined times, such as the end of the billing cycle for each customer, to retrieve the raw data records. Alternatively, the external interface 1130 may access the CDB 1120 in real time or near real time to retrieve raw data records and normalize the data records as they are received.

In any event, the data records received by gatherer 1150 may include a large number of data fields. Many of these fields may be irrelevant to billing unit 337. For example, as described above, the raw data record may include IP source and destination address information, which may not be needed by the billing unit 337. In this case, the external interface 1130 may drop these fields from the data record. The raw data record may also include start and end time for a communication. The duration of the communication may be relevant to the billing unit 337, but the start and end time may not be needed by the billing unit 337. In this case, the external interface 1130 may calculate the duration of the communication. The external interface 1130 may then drop the start and end times and insert the duration of the communication into the normalized data record.

The external interface 1130 may also perform a database lookup to identify the customer for billing purposes. For example, the raw data record received by gatherer 1150 may include a customer name as identified in the IPCOM unit 370. The customer's name, however, may not be recognized by the billing unit 337. In this case, the external interface 1130 may access CDB 1120 to obtain a customer identifier (ID) associated with the customer's name. The external interface 1130 performs a lookup in CDB 1120 based on the customer's name and obtains the ID with which the billing unit 337 recognizes the customer. In alternative implementations, the external interface 1130 may access an external database (i.e., a database not located within the data collection unit 336) to obtain the customer ID. In either case, the external interface 1130 inserts this ID into the normalized data record.

As another example, assume that one of the gatherers 1150 retrieves information from web center 360. The gather 1150 may obtain the number of agents associated with a particular customer that are stored in the agent information database 720. This information may include the name associated with the customer. In this case, the gatherer 1150 forwards the raw data records to CEM 1110.

The CEM 1110 stores the data records in CDB 1120. The external interface 1130 may then execute a program that creates a file associated with the agents of each particular customer. The file may include one record per agent and may indicate whether that agent has received at least one communication forwarded by the web center 360 (e.g., received a telephone call, an e-mail, a facsimile, an instant message, a VoIP communication, etc.). The record may also indicate whether the agent has been an active agent for the entire billing cycle or for a portion of the billing cycle. In an exemplary implementation, a customer may only be charged for agents who received at least one communication during a billing cycle. In addition, a customer may be charged for agents who were only active for a part of the billing cycle on a prorated basis. The external interface 1130 may also access CDB 1120 or another database to determine the customer's ID for billing purposes. The external interface 1130 may insert this information in the normalized data records.

As still another example, assume that one of the gatherers 1150 retrieves data records from voice portal unit 350. As described previously, the voice portal unit 350 may provide a number of information services to customers. For example, the customer may receive stock quotes, sports scores and weather information via the customer's selected device, such as a cellular phone, PDA, pager, computer, etc. The gatherer 1150 may access the voice portal unit 350 and retrieve the number of "hits" associated with a service, i.e., the number of communications received by a customer, such as the number of stock quotes, sports scores, etc. The gatherer 1150 may also retrieve information indicating the device with which the customer received the hits, e.g., a cell phone, PDA, computer, pager, etc. The gatherer 1150 may also retrieve the name associated with the customer.

The gatherer 1150 forwards this record information to the CEM 1110. The CEM stores this information in CDB 1120. The external interface 1130 may then count the total number of hits for the customer and may further break down the number of hits based on the devices on which the customer received the hits. The external interface 1130 may insert the total number of hits and/or the number of hits per device into an outgoing data record. The external interface 1130 may also perform a lookup in CDB 1120 or another database to obtain the customer's ID for billing purposes. The external interface 1130 inserts this information into the outgoing data record.

In summary, the data collection unit 336 receives raw data records that contain a large number of fields, e.g., 80 fields or more, from upstream network components. The data collection unit 336 modifies the raw data records based on the business requirements associated with the particular product/service into a revenue generating data record that is an appropriate format for the billing unit 337.

The external interface 1130 may then pass the normalized, revenue-generating data record to the billing unit 337 for rating (act 1250). As described above, the raw data record has been modified into a format appropriate for billing unit 337. The billing unit 337 receives the data record and rates the data record (act 1260). That is, the billing 337 determines the appropriate charges associated with the data record. The billing unit 337 may then generate the bill or pass the information relating to the customer's charges to a billing system that actually handles sending a bill to the customer.

Systems and methods consistent with the present invention provide a flexible system and method for collecting data records and creating revenue generating records. An advantage of the invention is that the same data collection unit can be customized for use with any number of products/services to collect data and create revenue generating records. For example, the data collection unit may collect data relating to the number of communications, types of communications, number of hits, number of agents/parties, etc. associated with a particular service and use this information to create revenue generating records. Another advantage of the invention is that the data collection unit may be easily modified based on the particular business requirements associated with rating and billing for various services/products to provide the billing unit 337 with the appropriate data.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, the present invention has been described mainly with respect to a few examples of services/products offered by a telecommunications service provider. It should be understood that the present invention may be used to support any additional services/products. In addition, the present invention has been described with respect to a data collection unit collecting and normalizing the data and a billing or rating unit rating the normalized data records to determine the appropriate charges. In alternative implementations, the functions performed by the data collection unit and rating unit may be combined so that a single system performs both tasks. Lastly, aspects of the present invention have been described as a series of acts in relation to FIG. 12. It should be understood that the order of these acts may vary in other implementations of the present invention. Moreover, non-dependent acts may be performed in parallel.

No element, act or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. In an operational support system that supports a plurality of telecommunications services, a method for generating billable data records associated with customers' use of the plurality of telecommunications services, comprising:
gathering raw data records, via a plurality of agent modules, from a number of network elements, each of the network elements being associated with at least one of the plurality of telecommunications services and interfacing with one of the agent modules, wherein a first one of the agent modules interfaces with a voice portal network element, a second one of the agent modules interfaces with a call center or contact center network element, a third one of the agent modules interfaces with a voice over Internet protocol (VoIP) services network element, and fourth one of the agent modules interfaces with an Internet protocol (IP) infrastructure network element;
identifying, by a processing device, information in the data records relevant to rating or billing;
generating, by the processing device, billable records based on the identifying, wherein the generating comprises:
converting the raw data records received from the first, second, third and fourth agent modules into normalized billing records associated with each of the plurality of telecommunication services;
forwarding the normalized billable records to a rating or billing system; and
rating the normalized billable records.

2. The method of claim 1, further comprising:
forwarding charge information based on the rating for billing the customer.

3. The method of claim 1, wherein the generating further comprises deleting a number of fields from the raw data records.

4. The method of claim 3, wherein the generating further comprises adding a number of fields to the raw data records.

5. The method of claim 1, further comprising:
accessing a database storing customer identifiers; and
performing a database lookup to determine the customer's identifier.

6. The method of claim 5, wherein the generating further comprises inserting the customer's identifier in the billable records.

7. The method of claim 1, wherein the plurality of telecommunications services comprises voice portal services, contact center services, voice over Internet protocol services and Internet protocol data services.

8. The method of claim 1, wherein the gathering raw data records, via the plurality of agent modules, from the number of network elements comprises:
- tracking use of the voice portal network element by each of a first plurality of customers,
- tracking use of the call center or contact center network element associated with each of a second plurality of customers,
- tracking actions performed by network gateways with respect to routing communications using the VoIP services network element for a third plurality of customers, and
- tracking actions performed by edge routers associated with the IP infrastructure network element for a fourth plurality of customers.

9. The method of claim 8, wherein the gathering raw data records further comprises:
- gathering information associated with the use of the voice portal network element by each of the first plurality of customers,
- gathering information based on the use of the call center or contact center by each of the second plurality of customers,
- gathering information based on the actions performed by the network gateways for each of the third plurality of customers, and
- gathering information based on the actions performed by the edge routers for each of the fourth plurality of customers.

10. The method of claim 9, wherein the converting the raw data records includes:
- calculating a number of uses of the voice portal network element for one of the first plurality of customers, and
- inserting the calculated number of uses in the billable record associated with the voice portal network element.

11. The method of claim 8, wherein the converting raw data records includes:
- calculating a duration of each of a plurality of network communications using the VoIP services network element, and
- inserting the calculated duration in a respective billable record associated with each of the network communications.

* * * * *